United States Patent
Darak et al.

(10) Patent No.: US 12,462,065 B1
(45) Date of Patent: Nov. 4, 2025

(54) SYSTEMS AND METHODS FOR REGULATING APPLICATION PERMISSIONS

(71) Applicant: GEN DIGITAL INC., Tempe, AZ (US)

(72) Inventors: Anand Darak, Pune (IN); Sharad Mhaske, Maharashtra (IN)

(73) Assignee: Gen Digital Inc., Tempe, AZ (US)

( * ) Notice: Subject to any disclaimer, the term of this patent is extended or adjusted under 35 U.S.C. 154(b) by 750 days.

(21) Appl. No.: 16/752,102

(22) Filed: Jan. 24, 2020

(51) Int. Cl.
*G06F 21/62* (2013.01)
*G06F 9/451* (2018.01)
*G06F 9/54* (2006.01)
*G06F 21/31* (2013.01)

(52) U.S. Cl.
CPC ............ *G06F 21/629* (2013.01); *G06F 9/451* (2018.02); *G06F 9/542* (2013.01); *G06F 21/31* (2013.01); *G06F 21/6281* (2013.01)

(58) Field of Classification Search
CPC ........ G06F 21/629; G06F 9/451; G06F 9/542; G06F 21/31; G06F 21/6281
See application file for complete search history.

(56) References Cited

U.S. PATENT DOCUMENTS

| | | | | |
|---|---|---|---|---|
| 10,956,586 B2 * | 3/2021 | Sadeh | ................... | H04L 67/306 |
| 11,693,984 B2 * | 7/2023 | Gupta | ................ | G06F 11/3438 726/30 |
| 11,706,584 B2 * | 7/2023 | Shepherd | .............. | H04W 4/029 455/418 |
| 2010/0162410 A1 * | 6/2010 | Chudy | .................... | G06F 21/10 726/27 |
| 2011/0145916 A1 * | 6/2011 | Mckenzie | ............... | G06F 21/53 718/1 |
| 2012/0317609 A1 * | 12/2012 | Carrara | ............... | G06F 21/6218 726/1 |
| 2013/0055411 A1 * | 2/2013 | Yang | ........................ | G06F 21/12 726/30 |
| 2016/0191534 A1 * | 6/2016 | Mallozzi | ............. | G06F 21/6218 726/4 |
| 2017/0011215 A1 * | 1/2017 | Poiesz | .................. | G06F 21/6209 |
| 2017/0249473 A1 * | 8/2017 | Lou | ........................ | G06F 11/366 |
| 2018/0095772 A1 * | 4/2018 | Wu | .......................... | G06F 16/00 |
| 2019/0179482 A1 * | 6/2019 | Ghosh | ................... | G06F 3/0416 |

* cited by examiner

*Primary Examiner* — Rupal Dharia
*Assistant Examiner* — Devin E Almeida
(74) *Attorney, Agent, or Firm* — Greenberg Traurig, LLP

(57) ABSTRACT

The disclosed computer-implemented method for regulating application permissions may include detecting a device permission control interface displayed on the computer and identifying an application associated with the device permission control interface. The method may also include determining a permission policy applicable to the identified application and overlaying a transparent window over the device permission control interface. The transparent window may restrict interaction with one or more control elements of the device permission control interface in accordance with the permission policy. Various other methods, systems, and computer-readable media are also disclosed.

20 Claims, 9 Drawing Sheets

SYSTEMS AND METHODS FOR REGULATING APPLICATION PERMISSIONS

BACKGROUND

As the computing capabilities of mobile devices have advanced, mobile devices have gained increasing functionalities. Applications, or apps, running on mobile devices may access various device resources in order to provide such functionalities. For example, a camera may be a mobile device resource that an app may access to provide text translation functionality. The mobile device's operating system may restrict apps from accessing resources as a safety precaution. Thus, the mobile device may present the user the option to allow apps that the user recognizes to access the device resources.

However, the user may not always be knowledgeable as to whether allowing a particular app access to a resource is safe. For example, a malicious app may disguise itself as a known photo editing app yet suspiciously request access to device location and contacts. It may also be desirable to restrict users from accessing resources. For example, a user may install the same app on multiple devices, including a corporate device, which may present a potential security or privacy threat. In another example, a parent may wish that their child's device does not share location data to apps.

The present disclosure, therefore, identifies and addresses a need for systems and methods for regulating application permissions.

SUMMARY

As will be described in greater detail below, the present disclosure describes various systems and methods for regulating application permissions.

In one example, a method for regulating application permissions may include (a) detecting a device permission control interface displayed on a computing device, (b) identifying an application associated with the device permission control interface, (c) determining a permission policy applicable to the identified application, and (d) overlaying a transparent window over the device permission control interface. The transparent window may restrict interaction with one or more control elements of the device permission control interface in accordance with the permission policy.

In some examples, the method may further include (e) detecting an update to the permission policy, (f) determining that a current permission setting for the application violates the updated permission policy, (g) launching the device permission control interface, and (h) overlaying the transparent window over the device permission control interface. The transparent window may permit interaction with the device permission control interface to change the current permission setting to comply with the updated permission policy. In some examples, the method may further include disabling access to the application when the current permission setting violates the updated permission policy.

In some examples, the method may further include displaying a message dialog for notifying a user about restrictions to the one or more control elements. In some examples, the device permission control interface may include a runtime permission dialog launched by the application. In some examples, the device permission control interface may include a static permission menu accessed through a device setting menu.

In some examples, the device permission control interface may be detected based on a window change event. In some examples, the transparent window may include one or more blocking elements overlaid onto the one or more control elements to prevent interaction with the one or more control elements. In some examples, the permission policy may be a default permission policy.

In one embodiment, a system for regulating application permissions may include at least one physical processor and physical memory that includes computer-executable instructions that, when executed by the physical processor, cause the physical processor to (a) detect a device permission control interface displayed on a display of the system, (b) identify an application associated with the device permission control interface, (c) determine a permission policy applicable to the identified application, and (d) overlay a transparent window over the device permission control interface. The transparent window may restrict interaction with one or more control elements of the device permission control interface in accordance with the permission policy.

In some examples, the instructions may further include instructions for (e) detecting an update to the permission policy, (f) determining that a current permission setting for the application violates the updated permission policy, (g) launching the device permission control interface, and (h) overlaying the transparent window over the device permission control interface. The transparent window may permit interaction with the device permission control interface to change the current permission setting to comply with the updated permission policy. In some examples, the instructions may further include instructions for disabling access to the application when the current permission setting violates the updated permission policy.

In some examples, the instructions may further include instructions for displaying a message dialog for notifying a user about restrictions to the one or more control elements. In some examples, the device permission control interface may include a runtime permission dialog launched by the application. In some examples, the device permission control interface may include a static permission menu accessed through a device setting menu.

In some examples, the device permission control interface may be detected based on a window change event. In some examples, the transparent window may include one or more blocking elements overlaid onto the one or more control elements to prevent interaction with the one or more control elements.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) detect a device permission control interface displayed on the computing device, (b) identify an application associated with the device permission control interface, (c) determine a permission policy applicable to the identified application, and (d) overlay a transparent window over the device permission control interface. The transparent window may restrict interaction with one or more control elements of the device permission control interface in accordance with the permission policy.

In some examples, the instructions may further cause the computing device to (e) detect an update to the permission policy, (f) determine that a current permission setting for the application violates the updated permission policy, (g) disable access to the application when the current permission setting violates the updated permission policy, (h) launch the device permission control interface, and (i) overlay the transparent window over the device permission control interface, wherein the transparent window permits interaction with the device permission control interface to change the current permission setting to comply with the updated permission policy.

In some examples, the device permission control interface may be detected based on a window change event.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
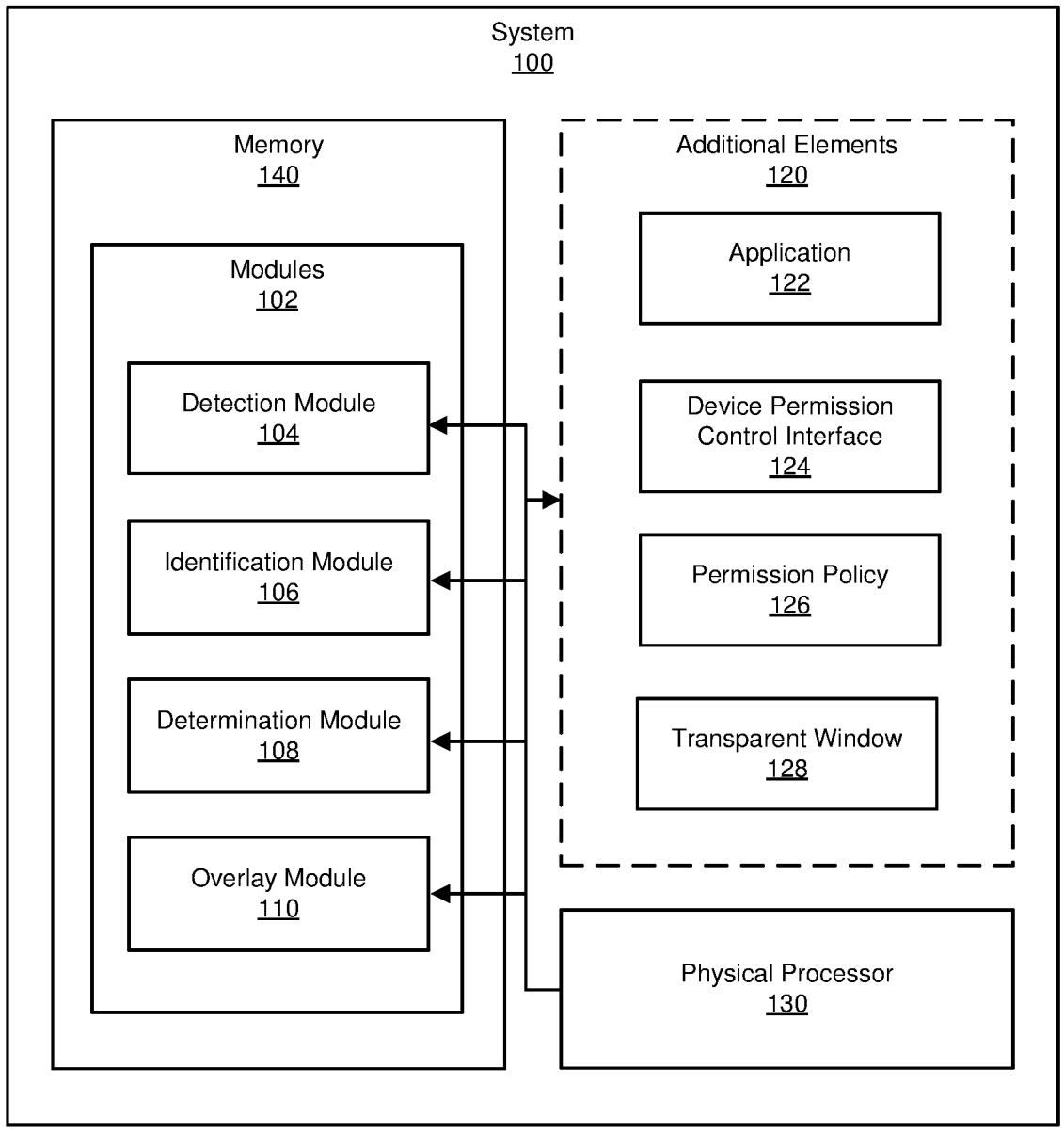
FIG. 1 is a block diagram of an example system for regulating application permissions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for regulating application permissions. Mobile devices often present users with device permission control interfaces for allowing or denying apps' requests to access device resources. However, it may be desirable to restrict which permissions the users may control. For instance, a corporate data privacy policy may require employees to deny camera access to any app. As will be explained in greater detail below, by detecting a device permission control interface and overlaying a transparent window over the device permission control interface to restrict interaction with control elements of the device permission control interface, the systems and methods described herein may enforce a permission policy on a computing device. By enforcing the permission policy in this way, the systems and methods described herein may be able to improve data privacy and device security without inhibiting the user's experience.

In addition, the systems and methods described herein may improve the functioning of a computing device by providing an efficient policy enforcement mechanism that minimizes overhead to an operating system. These systems and methods may also improve the field of mobile device security by addressing a potential security leak in conventional mobile operating systems.

Figure 2:
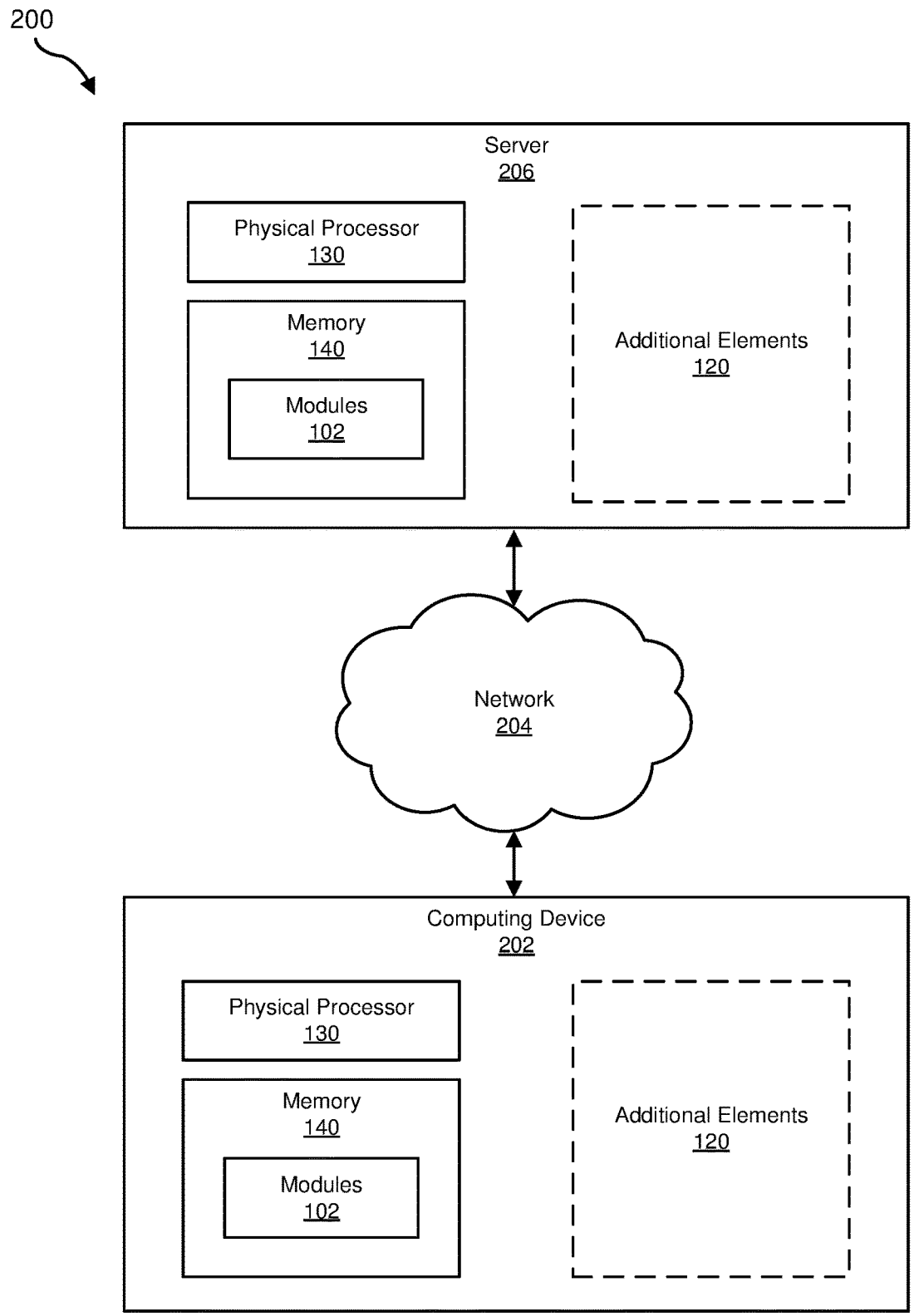
FIG. 2 is a block diagram of an additional example system for regulating application permissions.

The following will provide, with reference to FIGS. 1-2, detailed descriptions of example systems for regulating application permissions. Detailed descriptions of corresponding computer-implemented methods will also be provided in connection with FIG. 3. Detailed descriptions of runtime permission dialogs will be provided in connection with FIGS. 4A-B. Detailed descriptions of static permission menus will also be provided in connection with FIGS. 5A-B. In addition, detailed descriptions of an example computing system and network architecture capable of implementing one or more of the embodiments described herein will be provided in connection with FIGS. 6 and 7, respectively.

FIG. 1 is a block diagram of an example system 100 for regulating application permissions. As illustrated in this figure, example system 100 may include one or more modules 102 for performing one or more tasks. As will be explained in greater detail below, modules 102 may include a detection module 104, an identification module 106, a determination module 108, and an overlay module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate regulating application permissions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as an application 122, a device permission control interface 124, a permission policy 126, and a transparent window 128, which will be described further below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to regulate device permission settings for applications. For example, and as will be described in greater detail below, one or more of modules 102 may cause computing device 202 and/or server 206 to detect a device permission control interface, identify an application associated with the device permission control interface, determine a corresponding permission policy, and overlay a transparent window over the device permission control interface to restrict interaction with the device permission control interface in accordance with the permission policy.

Computing device 202 generally represents any type or form of computing device capable of reading computer-executable instructions. For example, computing device 202 may be an endpoint device, such as a mobile device, running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting permission policies for regulating device permission settings. For example, server 206 may be an enterprise server or a policy server capable of delivering permission policies. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
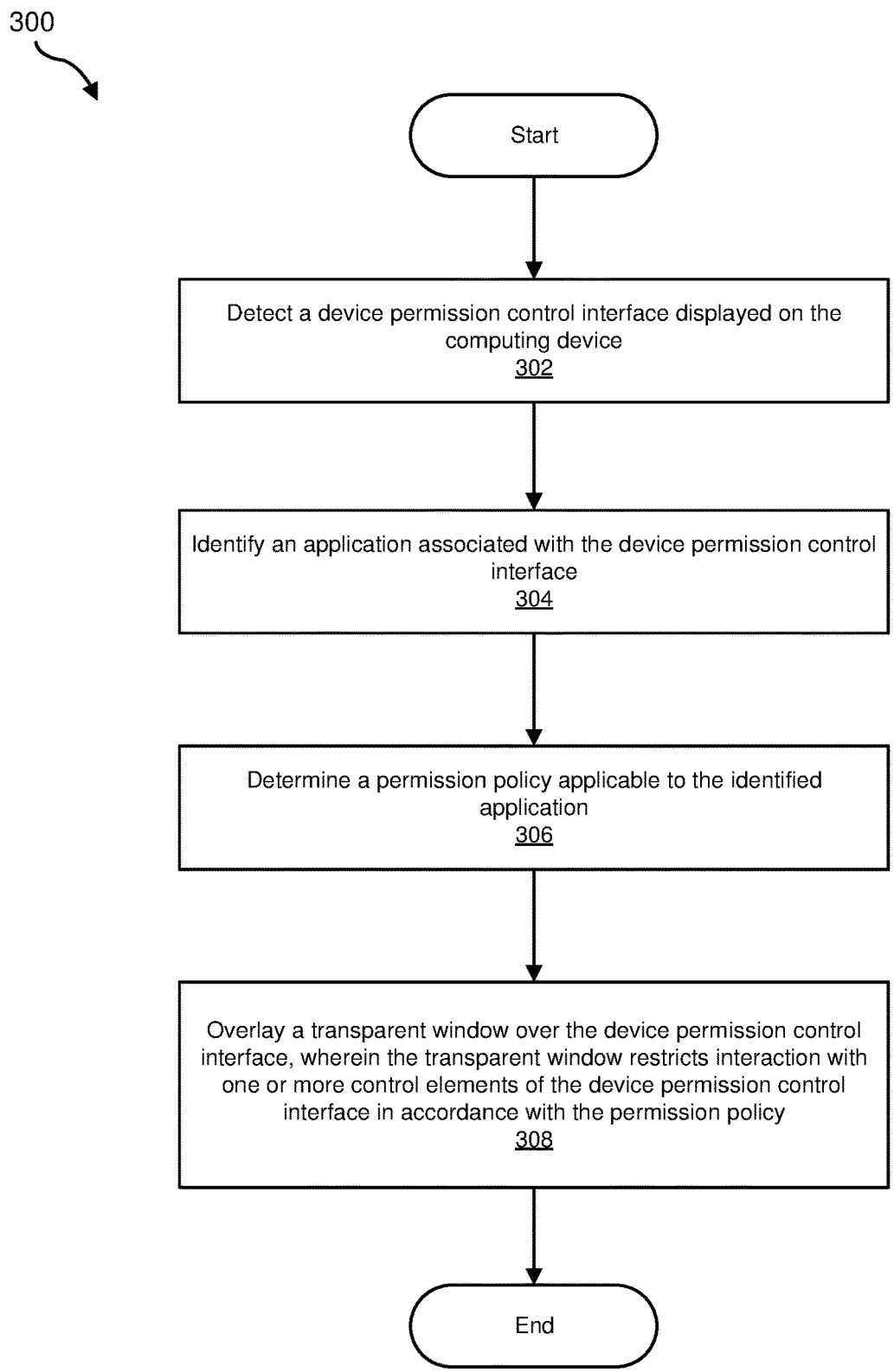
FIG. 3 is a flow diagram of an example method for regulating application permissions.

FIG. 3 is a flow diagram of an example computer-implemented method 300 for regulating application permissions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a device permission control interface displayed on the computing device. For example, detection module 104 may, as part of computing device 202 in FIG. 2, detect device permission control interface 124 displayed on computing device 202.

The term "device permission control interface," as used herein, generally refers to a user interface on a computing device which may allow a user to allow and/or deny an application access to one or more resources of the computing device. Examples of such resources include, without limitation, device storage, location (e.g., via GPS or other location-detecting hardware), microphone, camera, contacts (e.g., a user's contacts which may be stored or otherwise accessible through the computing device), etc. For example, a mobile device operating system may include an interface that a user may interact with to allow and/or deny applications running on the mobile device permission to access specific resources of the mobile device.

Device permission control interface 124 may take on various forms, which may further vary based on how device permission control interface 124 is invoked. FIGS. 4A-5B illustrate various device permission control interfaces.

Figure 4A:
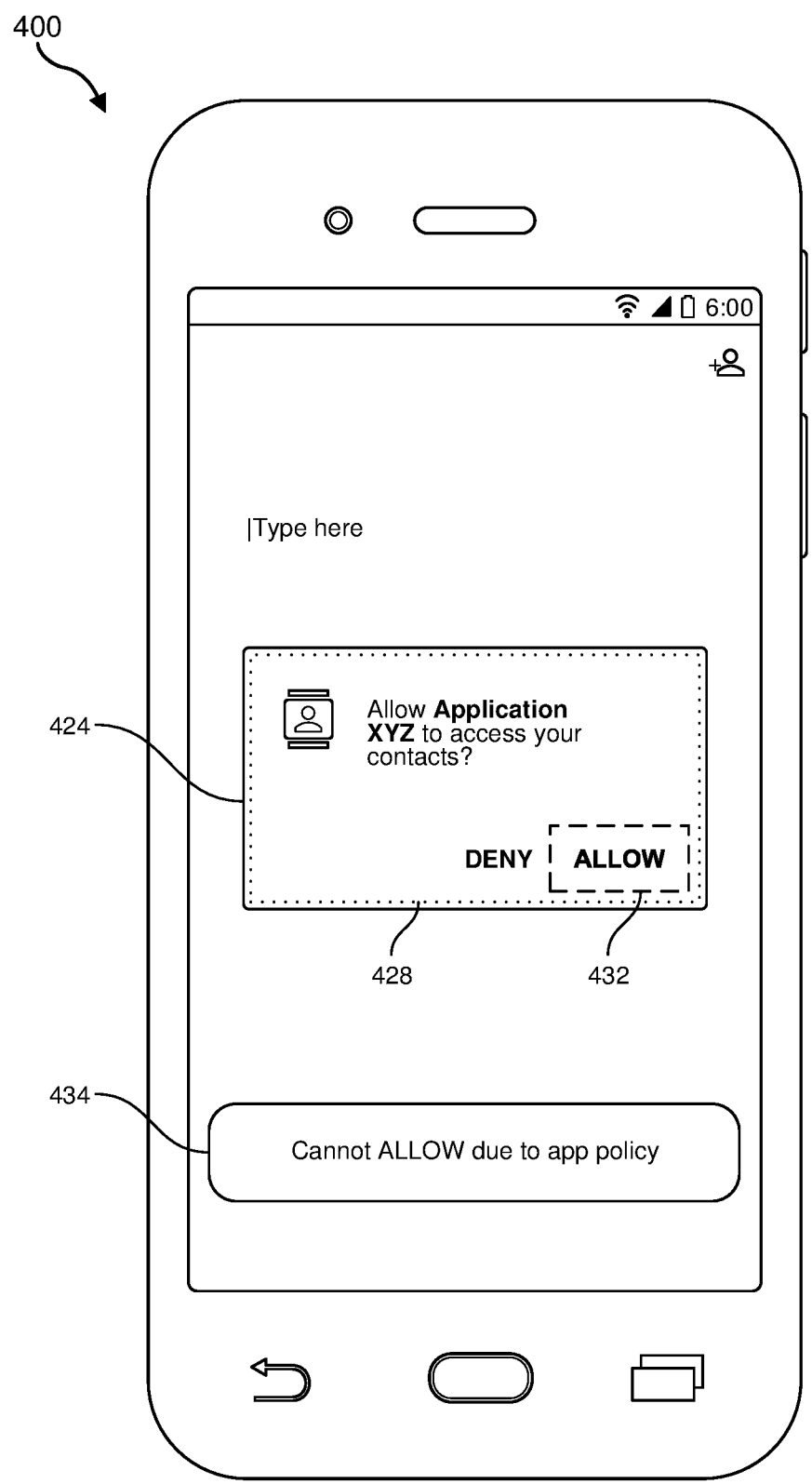
FIGS. 4A-B are sample screenshots of runtime permission dialogs implementing one or more of the embodiments described and/or illustrated herein.

In some embodiments, device permission control interface 124 may include a runtime permission dialog that may be launched by a corresponding application, such as application 122. FIG. 4A shows a screen 400 of a mobile device, which may correspond to system 100 and/or computing device 202. Screen 400 shows a runtime permission dialog 424, which may correspond to device permission control interface 124. Runtime permission dialog 424 may be invoked when application 122 is running and requests permission to one or more device resources. For instance, application 122 may invoke runtime permission dialog 424 when application 122 is being installed, when application 122 is launched, and/or when certain functions of application 122 requiring access to device resources are activated. Application 122 may invoke runtime permission dialog 424 for each device resource to independently request permission, or may invoke runtime permission dialog 424 to request permission for multiple device resources at once. Runtime permission dialog 424 may include control elements (e.g., "DENY" and "ALLOW" buttons) for modifying permission settings. FIG. 4A further shows a transparent window 428, a blocking element 432, and a message dialog 434, which will be described further below.

Figure 4B:
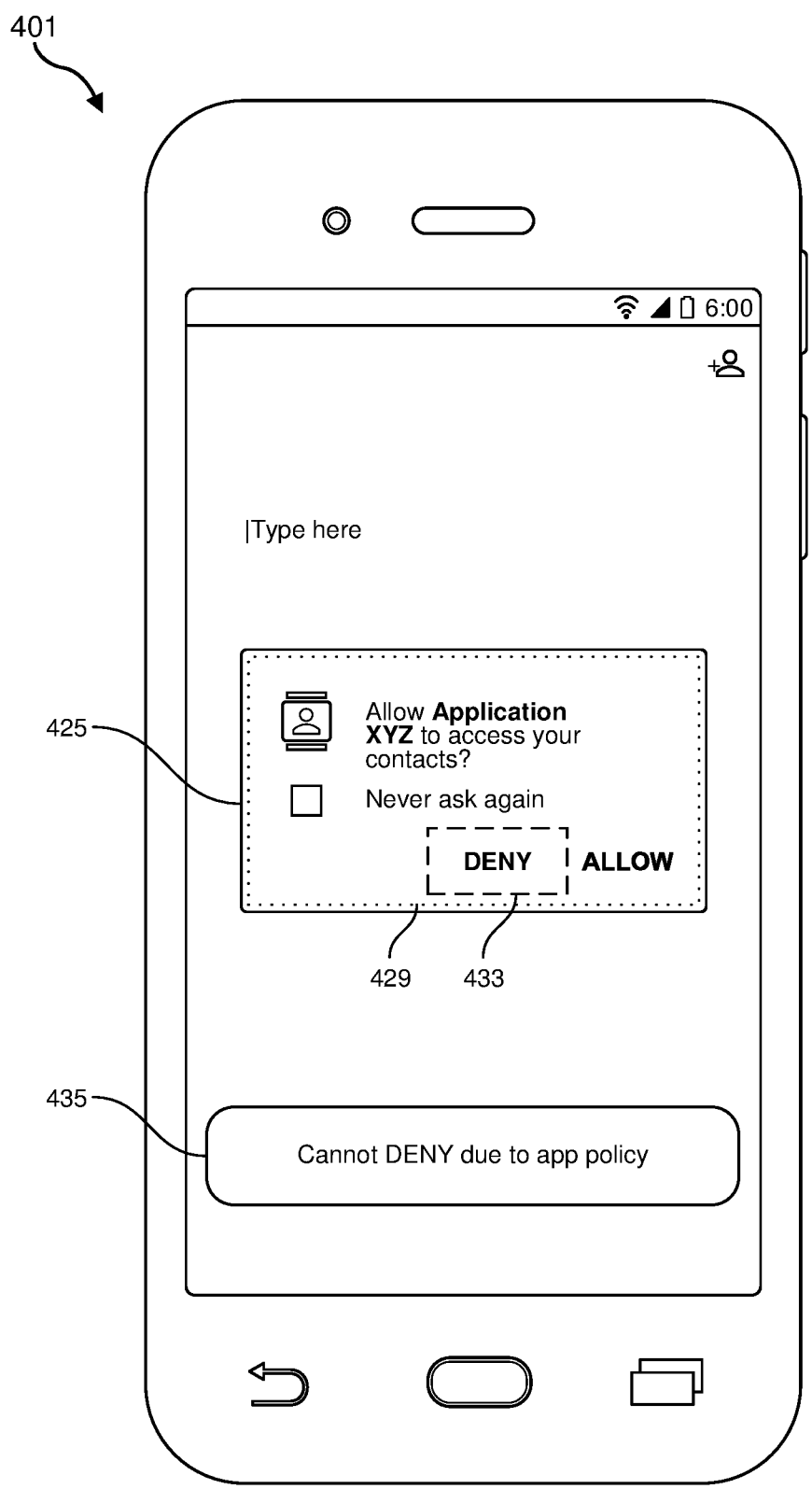

FIG. 4B shows a screen 401 of a mobile device, which may correspond to system 100 and/or computing device 202. FIG. 4B shows a runtime permission dialog 425, which may correspond to device permission control interface 124 and may be an alternative runtime permission dialog to runtime permission dialog 424. FIG. 4B further shows a transparent window 429, a blocking element 433, and a message dialog 435, which will be described further below.

Figure 5A:
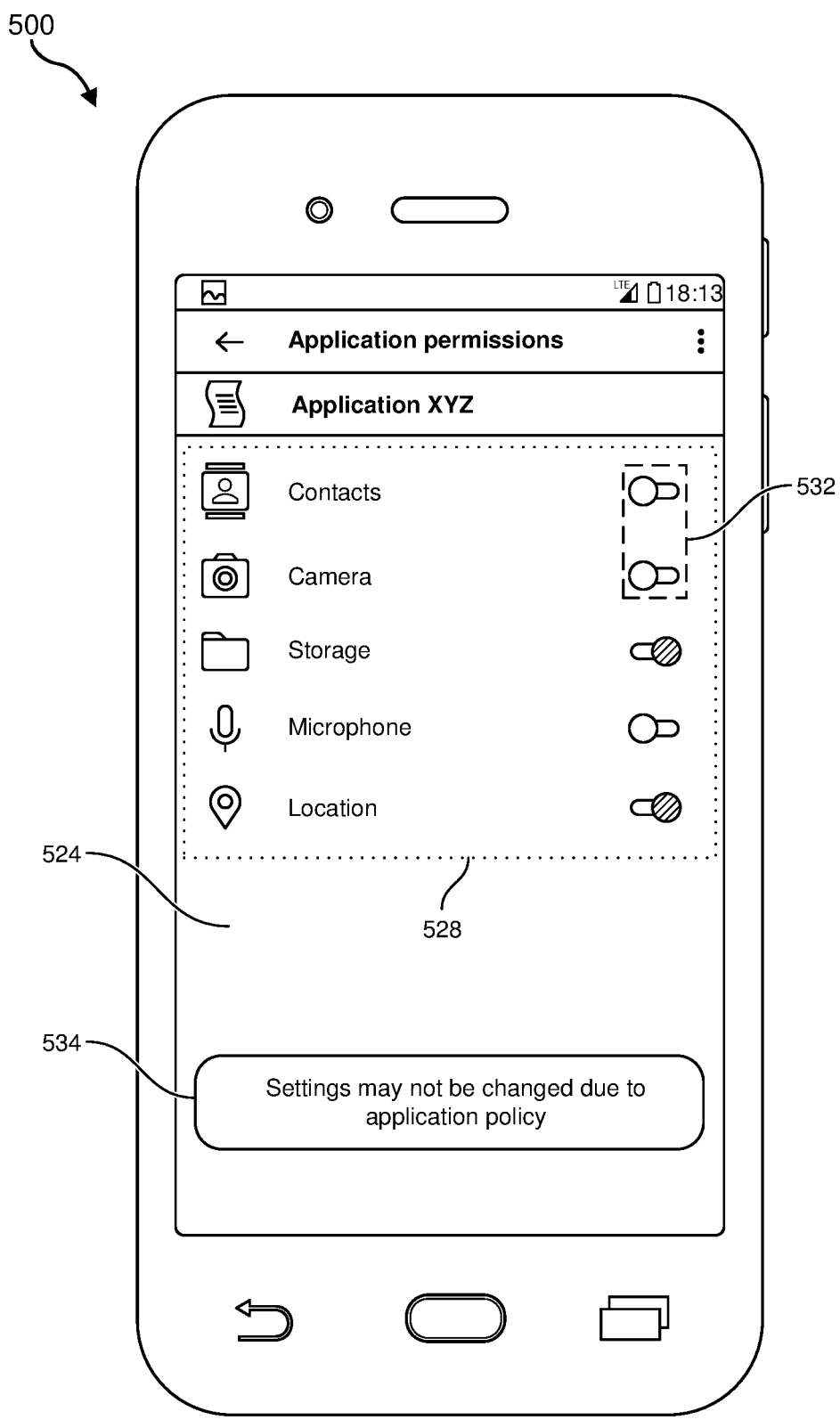
FIG. 5A-B are sample screenshots of static permission menus implementing one or more of the embodiments described and/or illustrated herein.

In some embodiments, device permission control interface 124 may include a static permission menu that may be accessed through a device setting menu. FIG. 5A shows a screen 500 of a mobile device, which may correspond to system 100 and/or computing device 202. FIG. 5A shows a static permission menu 524, which may correspond to device permission control interface 124. Static permission menu 524 may be invoked, for example, when the user navigates through device settings, specifically application permission settings for each individual application. Static permission menu 524 may correspond to application permission settings for a particular application, such as application 122. Static permission menu 524 may include one or more control elements (e.g., the toggle switches) for changing permission settings for each and every permission that application 122 may request and/or require. FIG. 5A further shows a transparent window 528, a blocking element 532, and a message dialog 534, which will be described further below.

Figure 5B:
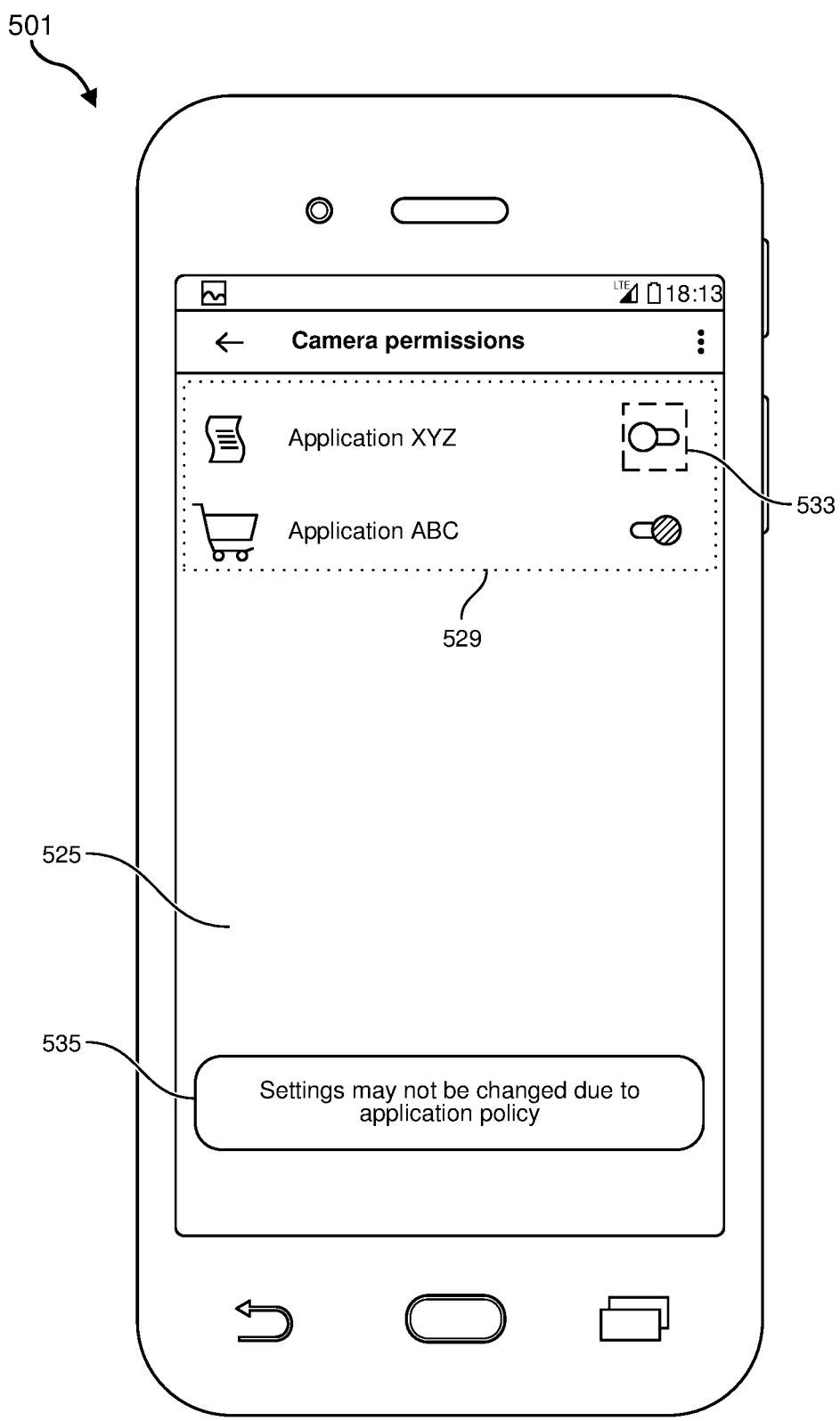

FIG. 5B shows a screen 501 of a mobile device, which may correspond to system 100 and/or computing device 202. FIG. 5B shows a static permission menu 525, which may correspond to device permission control interface 124 and may be an alternative static permission menu to static permission menu 524. Static permission menu 524 may organize application permissions based on application, whereas static permission menu 525 may organize application permissions based on device resource. As seen in FIG. 5B, static permission menu 525 may list all applications that request access to the device's camera. FIG. 5B further shows a transparent window 529, a blocking element 533, and a message dialog 535, which will be described further below. Although FIGS. 4A-5B show various examples of device permission control interface 124, in other implementations, device permission control interface 124 may include various other interfaces for controlling application permission settings.

Turning back to FIG. 3, the systems described herein may perform step 302 in a variety of ways. In one example, detection module 104 may detect device permission control interface 124 based on a window change event of computing device 202. For instance, an operating system of computing device 202 may include an application programming interface ("API"), such as an accessibility API, which may provide information regarding contents of a display of computing device 202 and changes therein. Detection module 104 may, via the accessibility API of computing device 202, detect a runtime permission dialog (e.g., runtime permission dialog 424 and/or 425) and/or a static permission menu (e.g., static permission menu 524 and/or 525).

At step 304, one or more of the systems described herein may identify an application associated with the device permission control interface. For example, identification module 106 may, as part of computing device 202 in FIG. 2, may identify application 122 as being associated with device permission control interface 124.

The term "application," as used herein, generally refers to executable code that may run on a computing device. Examples of applications include, without limitation, programs, processes, compiled code, binary code, apps, scripts, libraries, widgets, etc.

The systems described herein may perform step 304 in a variety of ways. In one example, identification module 106 may, via the accessibility API of computing device 202, determine that application 122 invoked or otherwise launched device permission control interface 124. For instance, application 122 may launch a runtime permission dialog. In another example, identification module 106 may, via the accessibility API of computing device 202, detect a static permission menu, and identify application 122 from the contents of the static permission menu. In yet other examples, the operating system of computing device 202 may provide application information to identification module 106.

At step 306, one or more of the systems described herein may determine a permission policy applicable to the identified application. For example, determination module 108 may, as part of computing device 202 in FIG. 2, determine that permission policy 126 applies to application 122.

The term "permission policy," as used herein, generally refers to rules regarding access to device resources based on application, user, device, time, etc. For instance, a permission policy may define which device resources an application may access, are restricted from accessing, and/or which permissions the user may configure. Examples of permission policies include, without limitation, enterprise policies, corporate policies, security policies, privacy policies, parent-control policies, child device usage policies, etc.

The systems described herein may perform step 306 in a variety of ways. In one example, determination module 108 may, as part of computing device 202 in FIG. 2, may request the applicable permission policy from server 206. Determination module 108 may, as part of server 206, send permission policy 126 to computing device 202 in response to the request.

Determination module 108 may determine that permission policy 126 is applicable based on one or more factors, in addition to identifying application 122. For instance, determination module 108 may determine permission policy 126 based on application attributes (e.g., application identification and/or name, version, publisher, type of application, and other application metadata), resource requested (e.g., corporate devices may restrict all cameras, a parent may restrict location resources of a child's device, etc.), user attributes (e.g., specific user, class or group of user, guest user, user privileges, etc.), device attributes (e.g., specific device, type or class of device, status of device, function or role of device, location of device, network topology relating to device, etc.), time (e.g., time of day, schedule, etc.), and other factors.

Permission policy 126 may include rules for whether application 122 may access each device resource available on computing device 202. For example, permission policy 126 may explicitly permit access to certain resources, explicitly restrict access to certain resources, and/or apply rules to permit and/or restrict access to resources in general.

In some examples, permission policy 126 may be a default permission policy. For instance, if application 122 is unrecognized or unknown or if a corresponding permission policy is unavailable, determination module 108 may designate the default permission policy. In some implementations, the default permission policy may be restrictive, for instance to preserve security and privacy. In other implementations, the default permission policy may be permissive, to minimize disruptions to the user experience.

In some examples, identification module 106 may identify application 122 as malware such that determination module 108 may perform a security action. For instance, determination module 108 may apply a restrictive permission policy as permission policy 126. In addition, determination module 108 may perform other security steps, such as sending a notification, alerting security software, etc.

Returning to FIG. 3, at step 308 one or more of the systems described herein may overlay a transparent window over the device permission control interface. The transparent window may restrict interaction with one or more control elements of the device permission control interface in accordance with the permission policy. For example, overlay module 110 may, as part of computing device 202 in FIG. 2, overlay transparent window 128 over device permission control interface 124, as displayed by computing device 202.

The term "transparent window," as used herein, generally refers to a layer, rendered by an operating system of a computing device, that may include transparent portions which allow layers thereunder (e.g., applications, operating system elements, other user interface elements, etc.) to be viewed and/or interacted with by a user as if the transparent window was not present. Examples of transparent windows include, without limitation, transparent layers, partially transparent layers, layers having less than 100% opaqueness, frames, and other user interface elements for display.

The systems described herein may perform step 308 in a variety of ways. In one example, transparent window 128 may include one or more blocking elements overlaid onto the one or more control elements to prevent interaction with the one or more control elements. Overlay module 110 may determine, via the accessibility API of computing device 202, on-screen locations of device permission control interface 124 and control elements thereof. Overlay module 110 may align blocking elements with corresponding control elements to restrict interaction with the control elements for enforcing permission policy 126. For instance, if permission policy 126 restricts application 122 from accessing a requested resource, transparent window 128 may include a blocking element which prevents a user from allowing access to the requested resource. FIGS. 4A-5B illustrate various examples of transparent windows.

FIG. 4A illustrates transparent window 428 overlaid onto runtime permission dialog 424 for an application "Application XYZ." As seen in FIG. 4A, runtime permission dialog 424 may request access to contacts for Application XYZ and may include several control elements for responding to the request (e.g., "DENY" button and "ALLOW" button). The applicable permission policy for Application XYZ in FIG. 4A may restrict Application XYZ from accessing contacts. Thus, transparent window 428 may include blocking element 432 over the "ALLOW" button to prevent a user from allowing Application XYZ to access the contacts on the device. Because the user may be prevented from allowing Application XYZ to access contacts, the permission policy may be enforced. Transparent window 428 may not affect other functionalities of the device and/or application. For instance, transparent window 428 may not include blocking elements for control elements not affected by the permission policy (e.g., the "DENY" button).

In some implementations, overlay module 110 may display a message dialog for notifying a user about restrictions to the one or more control elements. The message dialog may be an additional element of transparent window 128 or may be displayed separately, such as in a separate window or layer, or displayed using a notification API of the operating system of computing device 202. The message dialog may notify the user that the functionality of device permission control interface 124 may be limited or otherwise restricted. The message dialog may describe which specific actions may be restricted. For example, as seen in FIG. 4A, message dialog 434 may include a notification regarding a restriction to the "ALLOW" button. In other examples, the notification may include additional information, such as information regarding the applicable permission policy, who to contact regarding the permission policy, and other information. In yet other examples, the message dialog may be implemented with a popup allowing the user to obtain additional information by expanding the message dialog. The message dialog may include other notifications, such as security alerts (e.g., identifying malware), status updates, timestamps, etc. Alternatively, the message dialog may instead comprise a graphical notification, such as highlighting, graying out or reducing visibility of, other otherwise demarking control elements which may be restricted.

FIG. 4B illustrates transparent window 429 overlaid onto runtime permission dialog 425 for an application "Application XYZ." As seen in FIG. 4B, runtime permission dialog 425 may request access to contacts for Application XYZ and may include several control elements for responding to the request (e.g., "DENY" button, "ALLOW" button, and "Never ask again" checkbox). The applicable permission policy for Application XYZ in FIG. 4B may require Application XYZ to access contacts. Thus, transparent window 429 may include blocking element 433 over the "DENY" button to prevent a user from denying Application XYZ access to the contacts on the device in compliance with the permission policy. Transparent window 429 may not affect other functionalities of the device and/or application. FIG. 4B further shows message dialog 435, which may explain why certain functionalities (e.g., the "DENY" button) are disabled.

Although FIGS. 4A-B illustrate how the permission policy may restrict at least one control element, in other examples, the permission policy may not restrict any control elements. For example, in FIGS. 4A-B, if the permission policy did not require or restrict access to contacts, both buttons may remain enabled, such that the user may choose between the two options. In some implementations, overlay module 110 may ensure that at least one control element remains enabled such that the user may avoid being fixed into device permission control interface 124 with no means of proceeding.

FIG. 5A illustrates transparent window 528 overlaid onto static permission menu 524 for an application "Application XYZ." As seen in FIG. 5A, static permission menu 524 may include control elements for each resource that Application XYZ may request (e.g. toggle switches next to corresponding resources). The applicable permission policy for Application XYZ in FIG. 5A may restrict Application XYZ from accessing the contacts and the camera. Thus, transparent window 528 may include blocking element 532 over the toggle switches for the contacts and the camera to prevent a user from allowing Application XYZ to access the contacts and the camera, in compliance with the permission policy. Transparent window 528 may not affect other functionalities of the device and/or application. For instance, transparent window 528 may not include blocking elements for control elements not affected by the permission policy (e.g., permissions for storage, microphone, and location). FIG. 5A also shows message dialog 534 with a general message regarding the limited functionality of static permission menu 524.

FIG. 5B illustrates transparent window 529 overlaid onto static permission menu 525, which may be an alternative static permission menu. As seen in FIG. 5B, static permission menu 525 may organize permission settings based on device resource rather than by application (as in FIG. 5A). Thus, static permission menu 525 may list all applications that may request access to the camera. In such instances, overlay module 110 may apply multiple permission policies as needed for the listed applications. In FIG. 5B, a permission policy for Application XYZ may restrict Application XYZ from accessing the camera, whereas a permission policy for Application ABC may not have any restrictions for Application ABC with respect to the camera. Thus, transparent window 529 may include blocking element 533 over the toggle switch corresponding to Application XYZ but omit a similar blocking element with respect to Application ABC to comply with multiple permission policies. Transparent window 529 may not affect other functionalities of the device and/or application. FIG. 5B further illustrates message dialog 535 for generally explaining the restricted functionality of static permission menu 525.

In some examples, transparent window 128 may be sized similar to device permission control interface 124, as seen in FIGS. 4A-B. In other implementations, transparent window 128 may be sized differently. For example, transparent window 128 may be sized to cover relevant portions (e.g., interactive elements) of device permission control interface 124, as seen in FIGS. 5A-B. In other examples, transparent window 128 may be sized similar to application 122 as displayed on computing device 202. In some examples, application 122 may not be full screen, such as when multiple windows or applications are displayed on screen. In other examples, application 122 may be full screen, or transparent window 128 may be sized to cover the full screen. As elements on screen move, resize, or otherwise change, overlay module 110 may accordingly reposition and/or resize transparent window 128 accordingly, to ensure that the blocking elements are correctly aligned with corresponding control elements.

In some examples, transparent window 128 may be a blocking element itself and may include cutout portions to allow user interaction with control elements. In some examples, transparent window 128 may be implemented by intercepting user inputs, and discarding user inputs which would violate permission policy 126.

In some examples, transparent window 128 may persist on computing device 202 such that transparent window 128 may be updated based on the screen contents. In other examples, transparent window 128 may be presented in response to detecting device permission control interface 124 such that transparent window 128 may be removed when there is no device permission control interface detected.

In some examples, the current permission settings for application 122 may already violate permission policy 126. For instance, the permission settings may have been set before permission policy 126 was implemented. Alternatively, permission policy 126 may have been updated such that the current permission settings may be outdated. Determination module 108 may detect an update to permission policy 126. Determination module 108 may detect the update, for instance, by periodically checking in with server 206, receiving push notifications from server 206, or when triggered to determine an applicable permission policy (e.g. as part of step 308).

Determination module 108 may determine that a current permission setting for application 122 may violate updated permission policy 126. In some implementations, determination module 108 may disable access to application 122 until the current permission setting complies with permission policy 126. Disabling access may include, for example, preventing the user from launching application 122, disabling certain functions and features of application 122, quarantining application 122, requiring application 122 to run in a sandbox, etc. Determination module 108 may facilitate updating the current permission setting by launching device permission control interface 124. Overlay module 110 may then overlay transparent window 128 over device permission control interface 124 such that transparent window 128 may permit interaction with device permission control interface to change the current permission setting to comply with permission policy 126. Once the current permission setting complies, overlay module 110 may update transparent window 128 with appropriate blocking elements to prevent changes to device permission control interface 124 that may violate permission policy 126.

As explained above in connection with example method 300 in FIG. 3, an app permission-regulating technology may enforce device permission policies by using a transparent window or overlay to restrict which controls the user may manipulate. Such permission policy enforcement may be desirable, for instance, in corporate environments in which employees may be provided mobile devices, but require restricting third-party apps from accessing certain mobile device functionalities, such as camera, microphone, storage, etc. In another example, a parent may provide their child with a mobile device but may wish to restrict apps from accessing location data. In yet another example, a user may provide their mobile device to a guest who may modify the permission settings and potentially expose privacy risks.

During normal operation of the mobile device, an app on the mobile device may request access to a particular device resource. The subject technology may detect the device permission control interface and identify which app requested the access. The subject technology may then look up an applicable permission policy, which may define which resources the app may access. The permission policy may be defined based on restricting certain device functionalities in specific environments, restricting potential malware from accessing sensitive data, etc.

The subject technology may enforce the permission policy using a transparent overlay. The transparent overlay may allow the user to see the normal screen contents but may block the user from interacting with certain control elements. More specifically, the transparent overlay may block control elements that allows the permission settings to violate the permission policy. The subject technology may also provide a message dialog explaining the permission policy and disabled controls to the user.

Figure 6:
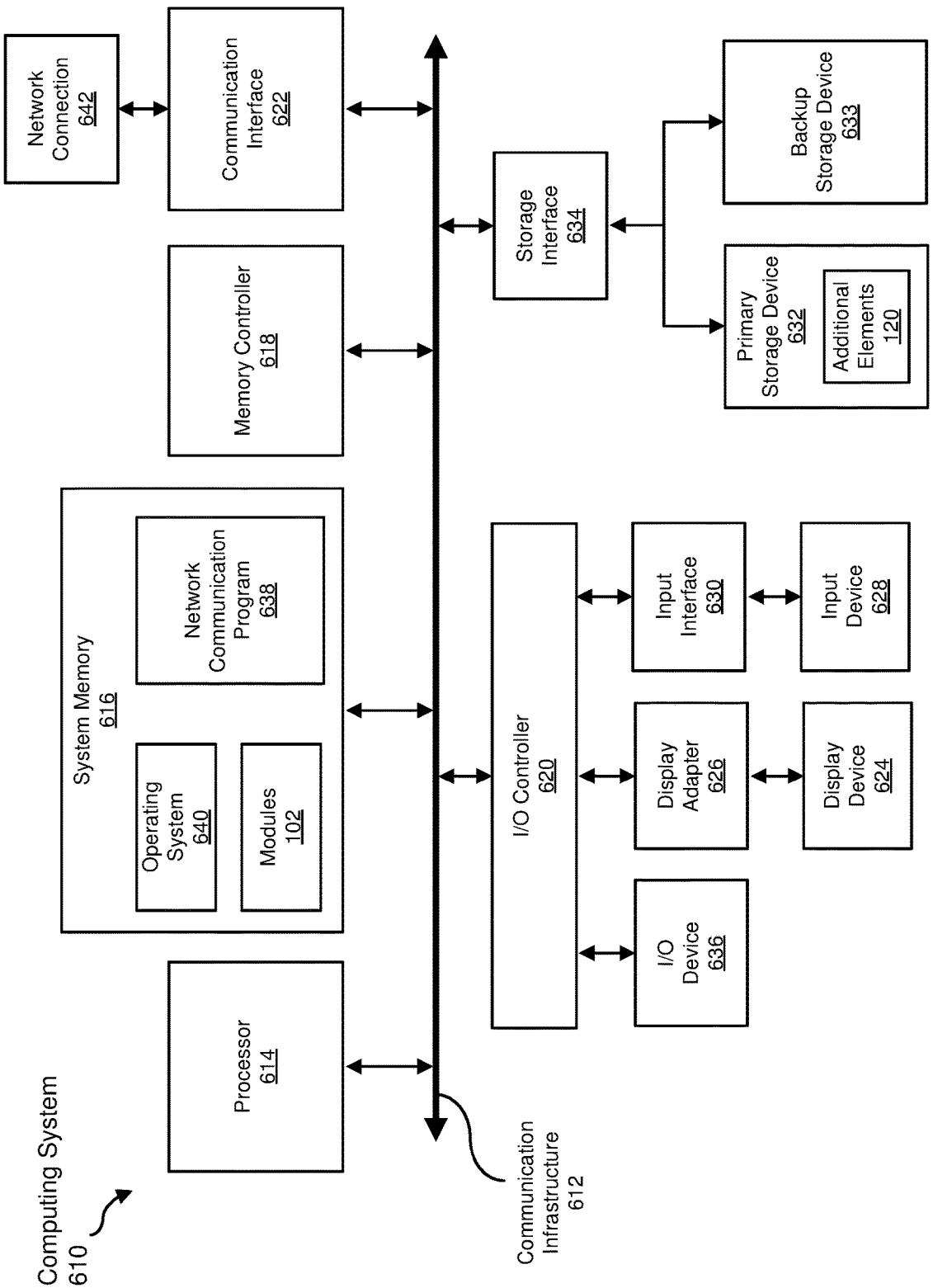
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
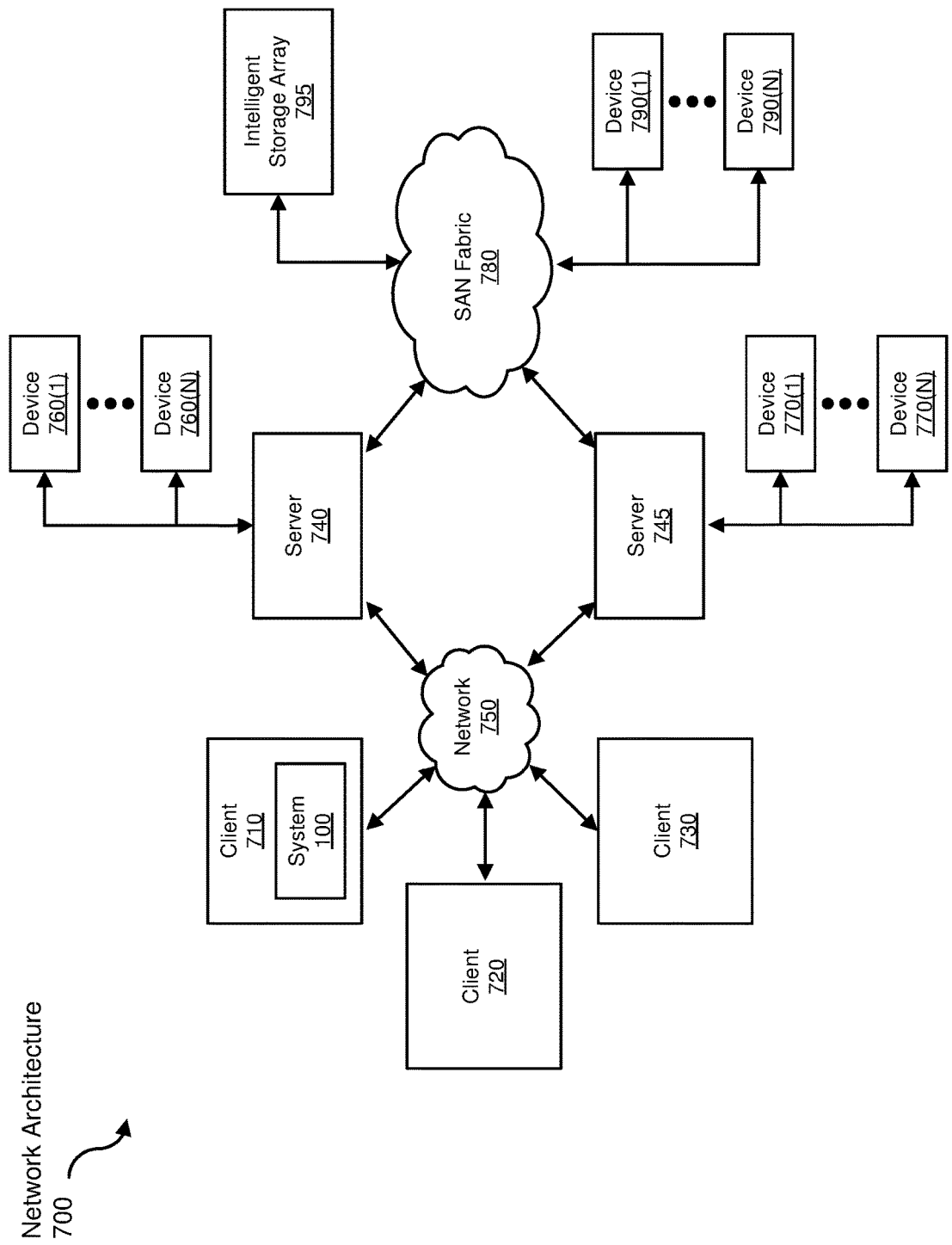
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for regulating application permissions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive overlay data to be transformed, transform the overlay data, and output a result of the transformation to restrict interaction to enforce permission policies. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for regulating application permissions, at least a portion of the method being performed by a computing device comprising at least one processor, the method comprising:
    detecting a device permission control interface displayed on the computing device;
    identifying an application associated with the device permission control interface;
    determining a permission policy applicable to the identified application;
    identifying an on-screen location of a control element of the device permission control interface corresponding to a resource restriction in accordance with the permission policy;
    overlaying a transparent window over the device permission control interface, wherein the transparent window allows the device permission control interface thereunder to be viewed and interacted with; and
    aligning a blocking element of the transparent window at the on-screen location of the control element to restrict interaction with the control element.

2. The method of claim 1, further comprising:
    detecting an update to the permission policy;
    determining that a current permission setting for the application violates the updated permission policy;
    launching the device permission control interface; and
    overlaying the transparent window over the device permission control interface, wherein the transparent window permits interaction with the device permission control interface to change the current permission setting to comply with the updated permission policy.

3. The method of claim 2, further comprising disabling access to the application when the current permission setting violates the updated permission policy.

4. The method of claim 1, further comprising displaying a message dialog for notifying a user about restrictions to the control element.

5. The method of claim 1, wherein the device permission control interface comprises a runtime permission dialog launched by the application.

6. The method of claim 1, wherein the device permission control interface comprises a static permission menu accessed through a device setting menu.

7. The method of claim 1, wherein the device permission control interface is detected based on a window change event.

8. The method of claim 1, wherein the blocking element is transparent.

9. The method of claim 1, wherein the permission policy is a default permission policy.

10. A system for regulating application permissions, the system comprising:
- at least one physical processor;
- physical memory comprising computer-executable instructions that, when executed by the physical processor, cause the physical processor to:
  - detect a device permission control interface displayed on a display of the system;
  - identify an application associated with the device permission control interface;
  - determine a permission policy applicable to the identified application;
  - identify an on-screen location of a control element of the device permission control interface corresponding to a resource restriction in accordance with the permission policy;
  - overlay a transparent window over the device permission control interface, wherein the transparent window allows the device permission control interface thereunder to be viewed and interacted with; and
  - align a blocking element of the transparent window at the on-screen location of the control element to restrict interaction with the control element.

11. The system of claim 10, wherein the instructions further comprise instructions for:
- detecting an update to the permission policy;
- determining that a current permission setting for the application violates the updated permission policy;
- launching the device permission control interface; and
- overlaying the transparent window over the device permission control interface, wherein the transparent window permits interaction with the device permission control interface to change the current permission setting to comply with the updated permission policy.

12. The system of claim 11, wherein the instructions further comprise instructions for disabling access to the application when the current permission setting violates the updated permission policy.

13. The system of claim 10, further comprising displaying a message dialog for notifying a user about restrictions to the control element.

14. The system of claim 10, wherein the device permission control interface comprises a runtime permission dialog launched by the application.

15. The system of claim 10, wherein the device permission control interface comprises a static permission menu accessed through a device setting menu.

16. The system of claim 10, wherein the device permission control interface is detected based on a window change event.

17. The system of claim 10, wherein the blocking element is transparent.

18. A non-transitory computer-readable medium comprising one or more computer-executable instructions that, when executed by at least one processor of a computing device, cause the computing device to:
- detect a device permission control interface displayed on the computing device;
- identify an application associated with the device permission control interface;
- determine a permission policy applicable to the identified application;
- identify an on-screen location of a control element of the device permission control interface corresponding to a resource restriction in accordance with the permission policy;
- overlay a transparent window over the device permission control interface, wherein the transparent window allows the device permission control interface thereunder to be viewed and interacted with; and
- align a blocking element of the transparent window at the on-screen location of the control element to restrict interaction with the control element.

19. The computer-readable medium of claim 18, wherein the instructions further cause the computing device to:
- detect an update to the permission policy;
- determine that a current permission setting for the application violates the updated permission policy;
- disable access to the application when the current permission setting violates the updated permission policy;
- launch the device permission control interface; and
- overlay the transparent window over the device permission control interface, wherein the transparent window permits interaction with the device permission control interface to change the current permission setting to comply with the updated permission policy.

20. The computer-readable medium of claim 18, wherein the device permission control interface is detected based on a window change event.

* * * * *